US008342049B2

(12) United States Patent
Rieger

(10) Patent No.: US 8,342,049 B2
(45) Date of Patent: *Jan. 1, 2013

(54) DUAL CLUTCH TRANSMISSION

(75) Inventor: Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 404 days.

This patent is subject to a terminal disclaimer.

(21) Appl. No.: 12/681,918

(22) PCT Filed: Oct. 8, 2008

(86) PCT No.: PCT/EP2008/063438
§ 371 (c)(1),
(2), (4) Date: Apr. 7, 2010

(87) PCT Pub. No.: WO2009/050080
PCT Pub. Date: Apr. 23, 2009

(65) Prior Publication Data
US 2010/0275707 A1 Nov. 4, 2010

(30) Foreign Application Priority Data
Oct. 15, 2007 (DE) .................. 10 2007 049 266

(51) Int. Cl.
*F16H 3/08* (2006.01)
(52) U.S. Cl. .......................................................... 74/330
(58) Field of Classification Search .................. 74/330, 74/333, 340
See application file for complete search history.

(56) References Cited

U.S. PATENT DOCUMENTS

| 6,244,123 | B1 | 6/2001 | Hegerath et al. | |
| 6,869,379 | B2* | 3/2005 | Voss et al. | 475/218 |
| 7,066,043 | B2* | 6/2006 | Kim et al. | 74/330 |
| 7,225,696 | B2* | 6/2007 | Gitt | 74/340 |
| 7,246,536 | B2 | 7/2007 | Baldwin | |
| 7,287,442 | B2 | 10/2007 | Gumpoltsberger | |
| 7,597,644 | B2* | 10/2009 | Rodgers, II | 475/218 |
| 7,604,561 | B2* | 10/2009 | Earhart | 475/218 |
| 7,604,565 | B2* | 10/2009 | Lee et al. | 477/3 |
| 8,051,732 | B2* | 11/2011 | Gitt | 74/331 |
| 2006/0054441 | A1 | 3/2006 | Ruedle | |

(Continued)

FOREIGN PATENT DOCUMENTS
DE 38 22 330 A1 7/1989
(Continued)

OTHER PUBLICATIONS

Prof. Dr. P. Tenberge; "Doppelkupplungsgetriebe in Planetenradbauweise Getriebestrukturen zwischen Automatik-und Doppelkupplungsgetrieben" Wissenportal baumaschine de 3 2007.

*Primary Examiner* — Ha D. Ho
(74) *Attorney, Agent, or Firm* — Davis & Bujold, PLLC

(57) ABSTRACT

A double clutch transmission with two clutches connected to a drive shaft and to one of two transmission input shafts. Fixed gears are coupled to the input shafts and engage idler gears. Several coupling devices connect the idler gears to a countershaft which have an output gear that couple gears of an output shaft such that at least seven power shift forward gears and at least one reverse gear can be shifted, and four gear wheel planes are positioned in a way that at least one power shift winding-path gear can be shifted via the shifting device.

46 Claims, 3 Drawing Sheets

U.S. PATENT DOCUMENTS

2009/0036247 A1 * 2/2009 Earhart et al. .................. 475/35

FOREIGN PATENT DOCUMENTS

| DE | 102 39 540 A1 | 3/2004 |
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

| GEAR | K1 | K2 | A | B | C | D | E | F | G | H |
|---|---|---|---|---|---|---|---|---|---|---|
| 1 |  | • |  |  |  |  |  |  | • | • |
| 2 | • |  |  |  |  |  |  |  | • |  |
| 3 |  | • |  | • |  |  |  |  |  |  |
| 4 | • |  |  |  | • |  |  |  |  |  |
| 5 |  | • |  |  |  |  | • |  |  |  |
| 6 | • |  |  |  |  | • |  |  |  |  |
| 7 |  | • | • |  |  |  |  |  |  |  |
| R1 |  | • |  |  |  |  |  | • |  |  |
| R2 | • |  |  |  |  |  |  | • |  | • |

# DUAL CLUTCH TRANSMISSION

This application is a National Stage completion of PCT/EP2008/063438 filed Oct. 8, 2008, which claims priority from German patent application serial no. 10 2007 049 266.0 filed Oct. 15, 2007.

FIELD OF THE INVENTION

The present invention relates to a double clutch transmission for a motor vehicle.

BACKGROUND OF THE INVENTION

Known from the publication DE 103 05 241 A1 is a 6-speed or 7-speed dual clutch transmission. The dual clutch transmission comprises two clutches, each connected with their inputs to the drive shaft and with their output to one of the two transmission input shafts. The two transmission input shafts are coaxially positioned each other. In addition, two countershafts are arranged to be axially parallel to the transmission input shafts, their idle gears mesh with the fixed gear wheels of the transmission input shafts. Furthermore, coupling devices that are axially movable and arranged on the countershaft in a rotationally fixed manner to shift the respective gear wheels. Each selected ratio is transferred by the drive gear wheels to a differential transmission. To achieve the desired gear ratio steps in this known double clutch transmission, a vast number of gear planes are required, so that a significant amount of installation space is needed.

In addition, a spur gear change speed transmission is known through the publication DE 38 22 330 A1. The spur gear change speed transmission comprises a double clutch, that is shiftable under power, where one part is connected with a drive shaft and the other part with a hollow drive shaft, rotatably supported on the drive shaft. For certain gear ratios, the drive shaft can be coupled with the hollow drive shaft via a shifting device.

Known from the publication DE 10 2004 001 961 A1 is a power transmission with two clutches, each of which are assigned to a partial transmission. The transmission input shafts of the two partial transmissions are positioned coaxial to each other and mesh, via fixed gear wheels, with idle gears of the designated countershaft. The respective idle gears of the countershafts can be connected, in a rotationally fixed manner, with the respective countershaft via designated shifting devices. The particular idle wheels of the countershaft can be connected via the assigned shifting devices with the associated countershaft in a rotationally fixed manner. A double clutch transmission is known from this publication, which absolutely requires at least six gear planes. Hence, the needed spatial installation requirement, in axial direction, increases with such transmission, so that the installation options are significantly limited with such known transmission.

SUMMARY OF THE INVENTION

It is the task of this present invention, to propose a double clutch transmission as in the previously described type, in which the power shiftable gear ratio steps are realized with the least spatial installation requirement, secondly, the transmission shall need only few component parts, hereby keeping the manufacturing cost for the transmission low.

Thus, a double clutch transmission with just five gear planes in the partial transmissions is realized, whereby the two partial transmissions can be coupled via at least one additional shifting device, to enable winding-path gears. Hereby, the proposed double clutch transmission realizes as few gear planes as possible, but providing a maximum number of transmission ratios, whereby preferably all forward gears and reverse gears are power shiftable in sequential mode.

The gear wheels of both partial transmissions are coupled with each other as a winding-path gear, to enable a flow of force through both partial transmissions. The respective shifting device which is used serves to couple idle gears and establish a dependency between transmission input shafts. Independently of the particular embodiment of the double clutch transmission, the configuration of the shifting devices for the coupling of two particular idle gears can be varied, so that the shifting element does not need to be positioned necessarily between the idle gears which need to be coupled.

Because of the low number of required gear planes, a short, axial configuration length is required for the proposed transmission, which enables also a front-transversal implementation into motor vehicles. Due to the fact that the inventive double clutch transmission also provides winding-path gears, and because of the three-shaft configuration, the multi-use of particular gear pairs or gear wheels, respectively, is enabled, which leads to a reduction of parts of the transmission.

In the proposed double clutch transmission, in accordance with the invention, gear planes can be provided, as a so-called dual gear plane and/or single gear plane. In a dual gear plane, an idle gear on the countershafts is each assigned to a fixed gear wheel of a transmission input shaft. To the contrary, in a single gear plane, just one idle gear on a countershaft is assigned to a fixed gear wheel of a transmission input shaft. Due to the fact that, in each dual gear plane, one idle gear can be used for at least two gears, the possible multi-use idle gears enables the realization of a certain number of gear ratios with less gear planes. Hence, the physical length of the transmission can be reduced.

For the use of single gear planes, in which just one idle gear on a countershaft is assigned to the fixed gear wheel of a transmission input shaft, a free range of the transmission ratios is possible.

The winding-path gears can be realized through several gear pairs or gear planes, respectively, so that additional gears can be shifted via the particular gear pairs or gear planes, respectively of the winding-path gears.

The proposed gear planes, in accordance with the inventive double clutch transmission, provide a gear set configuration to obtain at least seven forward gears and at least one reverse gear ratio, whereby at least one winding-path gear can be realized in the first gear step and/or can be shifted in one of the reverse gears can. Also additional winding-path gears can be shifted as the second up to the seventh gear, or also as reverse gear, whereby the seventh gear, depending on the sixth gear, can be power shifted. All forward gears and reverse gears should be, in sequential design, power shiftable. Non-power shiftable winding-path gears can be configured as intermediate gears, in which the transmission takes place between the ratios of two main drive gears, as overdrive gears or speed gears in which the gear ratio is smaller then the smallest gear ratio of the main drive gear ($6^{th}$ gear), as an off-road gear or low speed gear in which the gear ratio in each case is larger than the gear ratio of the first gear, and/or as additional reverse gears.

The power shiftable reverse gears, in the inventive double clutch transmission, are realized through just one additional arrangement or through just one additional gear wheel whereby and at least, through the additional gear plane, which reverses the rotation, a reverse gear can be realized as winding-path gear, and another reverse gear can be realize directly via the gear plane. The gear ratios of the reverse gears can, for instance, be varied by adding an additional step gear or similar.

Within the scope of an embodiment variation of the present invention, it can be provided that the four gear planes are realized through maximal two fixed gear wheels on each transmission input shaft, which mesh, for instance, with a maximum of four or less idle gears on the countershafts. Other constructions of embodiments are possible to realize the four gear planes.

In this embodiment variation, at least seven power shift forward gear and several reverse gear ratios can be realized, whereby at least the first gear can be configured as a winding-path gear and one of the reverse gears can be configured as a winding-path gear. The additional shifting device which is realized as the winding-path gears, is positioned in this embodiment variation on the first countershaft, between the second and the third gear plane. Other configuration options are also possible and additional shifting devices can be applied. The first reverse gear can be realized, as a winding-path gear, via the same clutch as the first gear. The second reverse gear can be arranged on the other clutch to be power shfited.

Another variation of the invention can provide that at least seven power shift forward gears and two reverse gear ratios can be realized, whereby at least a first gear is configured as a winding-path gear and the second reverse gear is configured as a winding-path gear.

Within the scope of and additional embodiment variation of the present invention and contrary to the previously described embodiment variation, an additional shifting device is provided to couple the partial transmissions on the second countershaft between the second and third gear planes. In this embodiment variation, at least seven power shift forward gears and one reverse gear are realized. The reverse gear is preferably configured as a winding-path gear.

To connect the idle gears in a rotationally fixed manner, for the individual gear ratio steps with the respective countershaft, dual action coupling devices are provided, for instance, between the third gear plane and the fourth gear plane on at least one of the countershafts. In addition, a single action coupling device can be positioned at least on one of the countershafts. The coupling devices can comprise, for instance, hydraulic actuated clutches or also interlocking claw clutches, as well as any kind of synchronization device. It is also possible to replace a dual action coupling device by two single action coupling devices and, vice versa.

It is possible to vary the presented configuration options, and also the number of the gear wheels as well as the number of the coupling devices can be altered, to realize further load or non-load shiftable gears, to realize installation space savings and the use of lesser parts in the proposed double clutch transmission. In addition, the respective configuration positioned of the coupling devices in the gear plane can be varied. Furthermore, also the operating direction of the coupling devices can be altered or extended, respectively.

Independent of the particular embodiment variation of the double clutch transmission, the drive shaft and the output shaft, preferably, do not need to be positioned coaxially to each other, which realizes especially an installation space saving configuration. For instance, shafts, which are spatial positioned one after the other, can also have a slight offset to each other. In that configuration, a direct gear with the transmission ratio one can be realized via gear meshing, and can, in an advantageous way, can be freely shifted to the fifth, the sixth, or the seventh gear. Other configuration options of the drive shaft and the output shaft are also possible.

The proposed double clutch transmission is preferably equipped with an integrated output stage. The output stage can comprise an output gear, a fixed gear wheel on the output shaft, which mesh is with a fixed gear wheel on the first countershaft, as well as with a fixed gear wheel on the second countershaft.

Advantageously, the lower forward gears and the reverse gears can be activated through a starting, or shifting clutch, to hereby concentrate higher loads on this clutch and to construct the second clutch with less need for installation space and as more cost-effective. Especially, the gear planes in the proposed double clutch transmission can be positioned in a way that one can start, through the inner transmission input shaft or through the outer transmission input shaft, hereby always a starting through the more appropriate clutch, which is also possible in a concentrically positioned, radial interlaced construction of the double clutch. Hereby and accordingly, the gear planes can be positioned as mirror-symmetric, or swapped, respectively. It is also possible to swap the countershafts or positioned them in a mirroring way.

BRIEF DESCRIPTION OF THE DRAWINGS

Following, the present invention is further explained based on the drawings. It shows.

DETAILED DESCRIPTION OF THE PREFERRED EMBODIMENTS

An inventive 7-gear double clutch transmission comprises two clutches K1, K2, the input sides of which are connected to a drive shaft w_an. Also, a torsion vibration damper 16 can be mounted on the drive shaft w_an. The output sides of the clutches K1, K2 are each connected with one of two transmission input shafts w_K1, w_K2, which are arranged coaxial to each other. The first transmission input shaft w_K1 is designed as a solid shaft and the second transmission input shaft w_K2 is designed as hollow shaft. In addition, countershafts w_vorlege1, w_vorgelege2 are provided which are positioned to be axial-parallel to each other. The coupling of the two transmission input shaft w_K1 and w_K2 takes place by way of a shifting device H via tooth meshing, so that the transmission input shafts w_K1 and w_K2 are coupled together.

Only four gear planes are provided in the 7-gear dual clutch transmission. In the first embodiment variation, in accordance with FIG. 1, the four gear planes 01-05, 02-13, 03-06, 04-07 are each realized via the fixed gear wheels 12, 13; 14, 15 of the two transmission input shafts w_K1, w_K2 and by way of the four idle gears 01, 02, 03, 04 on the first countershaft w_vorgelege 1, as well as through the idle gears 05, 06, 07 on the second countershaft w_vorgelege 2.

Figures 1, 1A:
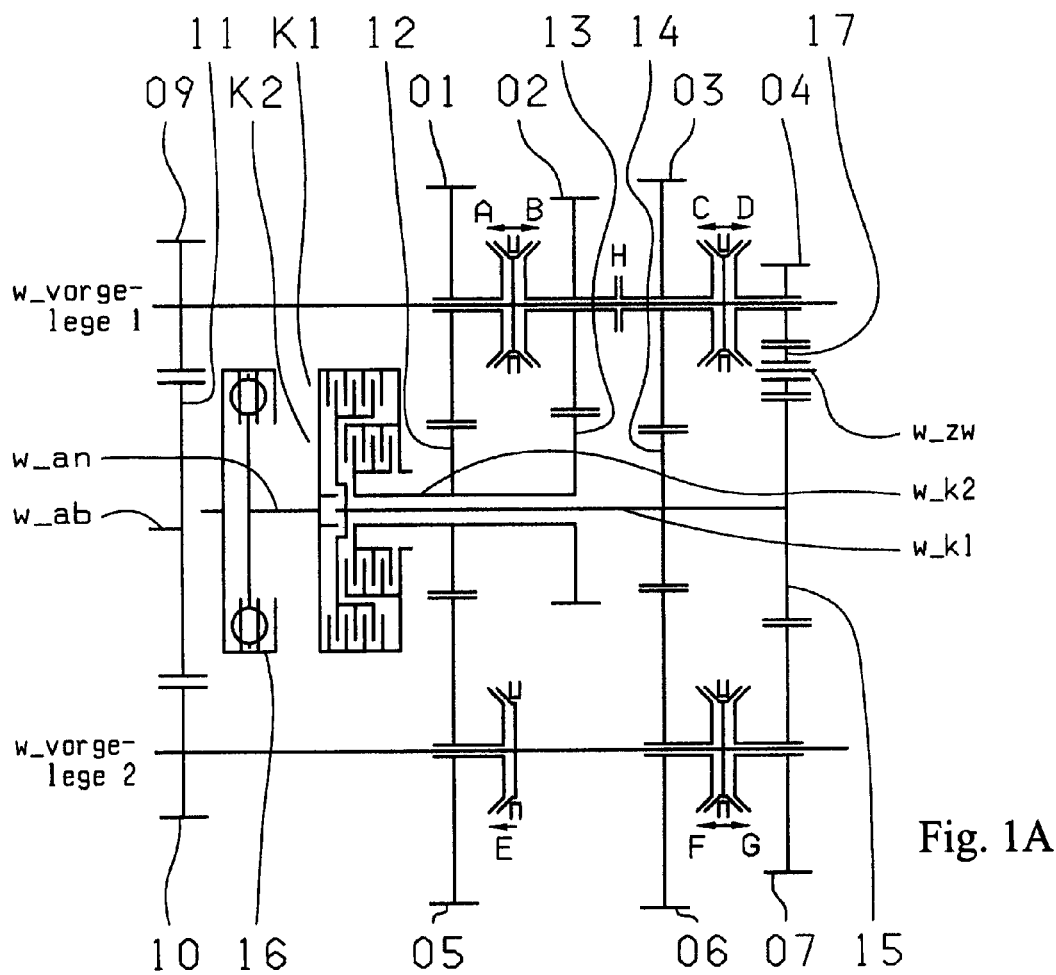
FIGS. 1 and 1A a schematic view of the first embodiment of a 7-gear double clutch transmission with an exemplary shifting scheme.

In the embodiment variation, in accordance with FIG. 1, the first gear plane 01-05 and the third gear plane 03-06, as well as the fourth gear plane 04-07 are each designed as dual gear plane. The second gear plane 02-13, however, is designed as single gear plane.

In the first gear plane 01-05, the fixed gear wheel 12 on the second transmission input shaft w_K2 meshes with the idle gear 01 on the first countershaft w_vorgelege 1, and with the idle gear 05 on the second countershaft w_vorgelege 2. The second gear plane 02-13 comprises the fixed gear wheel 13 on the second transmission input shaft w_K2, which only meshes with the idle gear 02 on the first countershaft w_vorgelege 1. Hence, the fixed gear wheel 13 on the second transmission input shaft w_K2 meshes in the second gear plane 02-13 only with the idle gear 02. Hereby, the advantage of a more free transmission gear selection arises, in contrast to gear planes with dual side engagement of the fixed gear wheel.

The third gear plane 03-06 comprises the fixed gear wheel 14 on the first transmission input shaft w_K1 which meshes with the idle gear 03 on the first countershaft w_vorgelege 1, and with the idle gear 06 on the second countershaft w_vorgelege 2.

Finally, in the fourth gear plane 04-07, the fixed gear wheel 15 on the first transmission input shaft w_K1 meshes with the idle gear 07 on the second countershaft w_vorgelege 2, also with an idle gear 17 on an intermediate shaft w_zw, the fixed gear wheel 15 on the first transmission input shaft w_K1 and also the idle gear 04 on the first countershaft w_vorgelege 1. Hereby, a reversal of rotation can be achieved to realize the reverse gears RA1, RA2, RB1. It is also possible to design the idle gear 17 as a step gear. For the reversal of rotation, the idle gear 04 on the first countershaft w_vorgelege 1 can also mesh with the idle gear 07 on the second countershaft w_vorgelege 1, so that the idle gear 17 can be omitted.

In this proposed gear set configuration, on the first countershaft w_vorgelege 1, dual action coupling devices A-B, C-D are each provided between the first gear plane 01-05 and the second gear plane 02-13, between the third gear plane 03-06 and the fourth gear plane 04-07. Also on the second countershaft w_vorgelege 2, a dual action coupling device F-G is positioned, between the third gear plane 03-06 and the fourth gear plane 04-07. In addition, a single action coupling device E is positioned on the second countershaft w_vorgelege 2, on the side which is facing away from the clutch K1, K2.

To realize winding-path gears, meaning to enable coupling of both partial transmissions, the additional shifting device H is positioned on the first countershaft w_vorgelege1, between the second gear plane 02-10 and the third gear plane 03-06.

The table, which is presented in FIG. 1A, shows an exemplary shifting scheme for the first embodiment variation of the 7-gear dual clutch transmission.

In accordance with the shifting schemes in FIG. 1A, the first forward gear 1 is shifted via the first clutch K2 and via the coupling device F-G, shifted the direction G, as well as via the activated shifting device H, as a winding-path gear. The second forward gear 2 is realized via the first clutch K1 and via the coupling device F-G, shifted in the direction G, the third forward gear 3 is shifted via the second clutch K2 and via the coupling device A-B, shifted in the direction B. The fourth forward gear for is again shifted via the clutch K1 and via the coupling device C-D, shifted in the direction C, whereby the fifth gear 5 is realize via the second clutch K2 and via the coupling device A-B, shifted in the direction A. Finally, the sixth forward gear 6 is shifted via the first clutch K1 and via the coupling device F-G, shifted in the direction F, whereby the seventh forward gear 7 is shifted via the second clutch K2 and via the coupling device E on the second countershaft w_vorgelege 2. The first reverse gear RA1 is shifted via the second clutch K2 and via the coupling device C-D, shifted in the direction D. the second reverse gear RA2 and the alternative first reverse gear RB1 are each shifted via the first clutch K1 and via the coupling device C-D, shifted in the direction D.

Thus, the first forward gear 1 arranged as a winding-path gear, using the gear wheels 13, 02, 03, 14, 07, and 10. The second forward gear 2 uses the gear wheels 15, 07, and 10, whereby the gear wheels 13, 02, and 09 are used to realize the third forward gear 3. The fourth forward gear 4 uses the gear wheels 14, 03, and 09, whereby the fifth forward gear 5 uses the gear wheels 12, 01, and 09, whereby the sixth forward gear 6 uses the gear wheels 14, 06, and 10. Finally the seventh forward gear 7 uses the gear wheels 12, 05, and 10. For the first reverse gear RA1 engaged as a winding-path gear, the gear wheels 13, 02, 03, 14, 15, 17, 04, and 09 are used. For the second reverse gear RA2, the gear wheels 15, 17, 04, and 09 are used, whereby the same gear wheels are used for the alternative first reverse gear RB1

Other assignment configurations of the particular gear steps in this embodiment variation, in regard to the clutches, are also possible. Especially with mirror image, for instance, a reversed assignment configuration can easily be realized.

Figures 2, 2A:
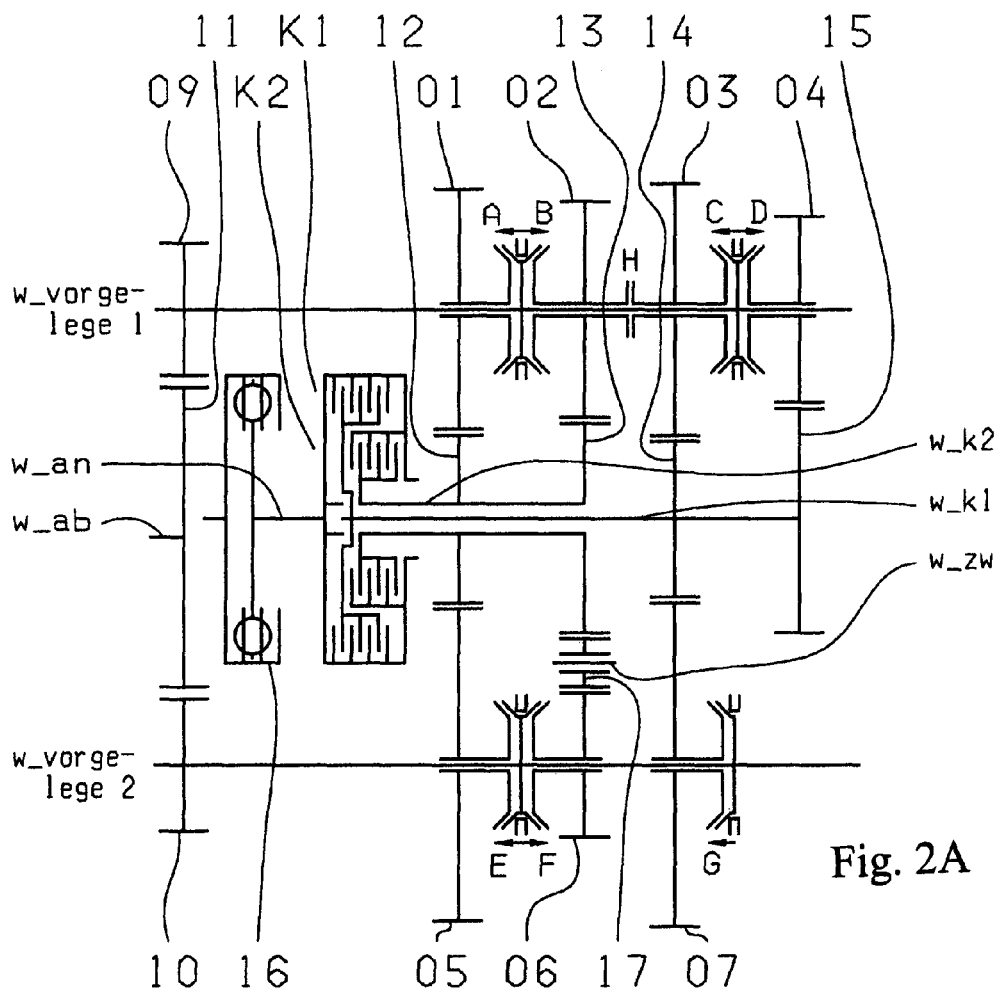
FIGS. 2 and 2A a schematic view of a second embodiment variation of the inventive 7-gear double clutch transmission with an exemplary shifting scheme.

In the second embodiment variation, in accordance with FIG. 2, the four gear planes 01-05, 02-06, 03-07, 04-15 are each realized through two fixed gear wheels 12, 13; 14, 15 on the two transmission input shafts w_K1, w_K2 and through four idle gears 01, 02, 03, 04 on the first countershaft w_vorgelege 1, three idle gears 05, 06, 07 on the second countershaft w_vorgelege 2.

In the embodiment variation, in accordance with FIG. 2, the first gear plane 01-05 and the second gear plane 02-06, as well as the third gear plane 03-07 are each designed as dual gear planes. In contrary, the fourth gear plane 04-15 is designed as a single gear plane.

In the first gear plane 01-05, the fixed gear wheel 12 of the second transmission input shaft w_K2 meshes with the idle gear 01 on the first countershaft w_vorgelege 1, and with the idle gear 05 on the second countershaft w_vorgelege 2, as it is provided in the first embodiment variation.

Contrary to the first embodiment variation, the second gear plane 02-06 comprises the fixed gear wheel 13 on the second transmission input shaft w_K2, which meshes with the idle gear 02 on the first countershaft w_vorgelege 1. Also, the idle gear 17 on an intermediate shaft w_zw meshes with the fixed gear wheels 13 on the second transmission input shaft w_K2, and with the idle gear 06 on the second countershaft w_vorgelege 2. Hereby, a reversal of rotation can be achieved to realize the reverse gears R1 and R2. It is also possible to design the idle gear 17 as a step gear. For the reversal of rotation, the idle gear 06 on the second countershaft w_vorglege 2 can also mesh with the idle gear 02 on the first countershaft w_vorgelege 1, so that the idle gear 17 can be omitted.

The third gear plane 03-07 comprises the fixed gear wheels 14 on the first transmission input shaft w_K1, which meshes with the idle gear 03 on the first countershaft w_vorgelege 1, with the idle gear 07 on the second countershaft w_vorgelege 2.

Finally, in the fourth gear plane 04-15, the fixed gear wheels 15 on the first transmission input shaft w_K1 only meshes with the idle gear 04 on the first countershaft w_vorgelege 1. Hereby, the advantage of a more free transmission gear selection arises, in contrast to gear planes with dual side arrangement of the fixed gear wheel.

In this proposed gear set configuration, a dual action coupling devices A-B, C-D are each provided, on the first countershaft w_vorgelege 1, between the first gear plane 01-05 and the second gear plane 02-06, and between the third gear plane 03-07 and the fourth gear plane 04-15. On the second countershaft w_vorgelege 2, a dual action coupling device E-F is positioned between the first gear plane 01-05 and the second gear plane 02-06. In addition, a single action coupling device G is positioned on the second countershaft w_vorgelege 2, on the side which is facing away from the clutches K1, K2, of the third gear plane 03-07.

The table, which is presented in FIG. 2A, shows an exemplary shifting scheme for the first embodiment variation of the 7-gear dual clutch transmission.

In accordance with the shifting schemes in FIG. 2A, the first forward gear 1 is shifted via the second clutch K2 and via the coupling device G on the second countershaft w_vorgelege 2, shifted in the direction G, and via the activated shifting device H, as a winding-path gear. The second forward gear 2 is realized via the first clutch K1 and via the coupling device G on the second countershaft w_vorgelege 2, shifted in the direction G, the third forward gear 3 is shifted via the second clutch K2 and via the coupling device A-B, shifted in the direction B. The fourth forward gear for is again shifted via the first clutch K1 and via the coupling device C-D, shifted in the direction C, whereby the fifth forward gear 5 is realized via the second clutch K2 and via the coupling device E-F, shifted in the direction E. Finally, the sixth forward gear 6 is shifted via the first clutch K1 and the coupling device-D, shifted in the direction D, whereby the seventh forward gear 7 is again shifted via the second clutch K2 and via the coupling device A-B, shifted in the direction A. The first reverse gear R1 is shifted via the second clutch K2 and via the coupling device E-F, shifted in the direction F. The second reverse gear R2 is shifted via the first clutch K1 and via the coupling device E-F, shifted in the direction F, as well as via the activated shifting device H as a winding-path gear.

Thus, the first forward gear 1 is engaged, as a winding-path gear using the gear wheels 13, 02, 03, 14, 07, and 10. In the second forward gear 2, the gear wheels 14, 07, and 10 are used, the gear wheels 13, 02, and 09 are used to realize the third forward gear 3. In the fourth forward gear 4, the gear wheels 14, 03, and 09 are used, in the fifth forward gear 5 the gear wheels 12, 05, in 10 are used, the sixth forward gear 6 uses the gear wheels 15, 04, and 09. Finally, the seventh forward gear 7 uses the gear wheels 12, 01, and 09. The first reverse gear R1 uses the gear wheels 13, 17, 06, and 10, the second reverse gear R2 is engaged as a winding-path gear, using the gear wheels 14, 03, 02, 13, 17, 06, and 10.

Other assignment configurations of the particular gear steps in this embodiment variation, in regard to the clutches, are also possible. Especially through mirroring, for instance, a reversed assignment configuration can easily be realized.

Figures 3, 3A:
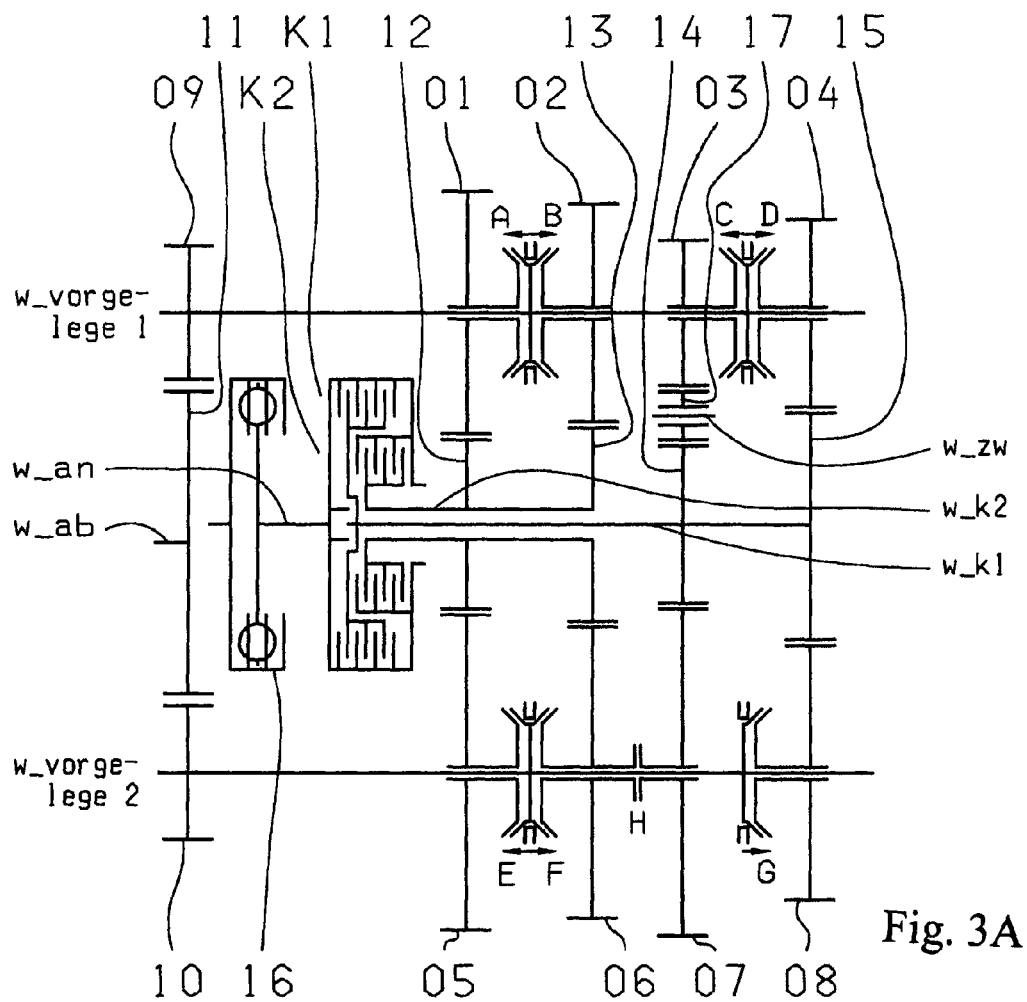
FIGS. 3 and 3A a schematic view of a third embodiment variation of the inventive 7-gear double clutch transmission with an exemplary shifting scheme.

In contrast to the first and the second embodiments variation, the additional shifting device H, in the third embodiment variation in accordance with FIG. 3, is provided on the second countershaft w_vorgelege 2 for the coupling of the two partial transmissions, between the second gear plane 02-06 and the third gear plane 03-07. Another difference is an additional idle gear 08 which is positioned on the second countershaft w_vorgelege 2. This idle gear 08 expands the fourth gear plane 04-08 in a way, that the fixed gear wheels 15 on the first transmission input shaft w_K1 meshes with the idle gear 04 on the first countershaft w_vorgelege 1 as well as with the idle gear 08 on the second countershaft w_vorgelege 2. Contrary the second embodiment variation, the single action coupling device G, in the third embodiment variation, is positioned on the second countershaft w_vorgelege 2, on the side which is facing away from the clutches of the fourth gear plane 04-08.

The third gear plane 03-07 also provides that the fixed gear wheels 14 and the idle gear 07 on the second countershaft w_vorgelege 2, and also an idle gear 17 on an intermediate shaft w_zw, mesh with, the fixed gear wheel 14 with the idle gear 07 on the second countershaft w_vorgelege 2, as well as with idle gear 03 of the first countershaft w_vorgelege 1. In this case, a rotation reversal can be provided to realize the reverse gear R1. It is also possible, that the idle gear 17 is designed as a step gear. The provide the rotation reversal, the idle gear 07 on the second countershaft w_vorgelege 2 meshes with the idle gear 03 on the first countershaft w_vorgelege 1, so that the idle gear 17 can be omitted.

In the embodiment variation, in accordance with FIG. 3, all gear planes 01-05, 02-06, 03-07, and 04-08 are designed as dual gear planes.

The table, which is presented in FIG. 3A, shows an exemplary shifting scheme for the first embodiment variation of the 7-gear dual clutch transmission.

In accordance with the shifting schemes in FIG. 3A, the first forward gear 1 is shifted via the second clutch K2 and via the coupling device A-B, shifted in the direction B. The second forward gear 2 is realized via the first clutch K1 and via the coupling device C-D, shifted into the direction C, the third forward gear 3 is shifted via the second clutch K2 and via the coupling device E-F, shifted in the direction F. The fourth forward gear 4 is again shifted via the first clutch L1 and via the coupling device C-D, shifted in the direction D, whereby the fifth forward gear 5 is realized via the second clutch K2 and via the coupling device A-B, shifted in the direction A. Finally, the sixth forward gear 6 is shifted via the first clutch K1 and via the coupling device G on the second countershaft w_vorgelege 2, whereby the seventh forward gear 7 is again shifted via the second clutch K2 and via the coupling device E-F, shifted in the direction E. The reverse gear R1 is shifted via the second clutch K2 and via the, shifted into the direction C, coupling device C-D, as well as via the shifting device H as a winding-path gear.

Thus, the first forward gear 1 uses the gear wheels 13, 02, and 09. The second forward gear 2 uses the gear wheels 14, 03, and 09, the gear wheels 13, 0, and 10 are used to realize the third forward gear 3. For the fourth forward gear 4, the gear wheels 15, 04, and 09 are used, the fifth forward gear 5 uses the gear wheels 12, 01, and 09, the sixth forward gear 6 uses the gear wheels 15, 08, and 10. Finally, the seventh forward gear 7 uses the gear wheels 12, 05, and 10. The reverse gear R1 uses, as a winding-path gear, the gear wheels 13, 06, 07, 14, 17, 03, and 09.

Other assignments for the particular gear steps, in regard to clutches, are also possible in this embodiment variation. Especially, and for instance through mirroring, a reversed assignment can easily be realized.

In the above described embodiment variations, the direction into which the coupling devices are shifted, to connect a particular idler gear wheel with the respective countershaft, can be altered by a modifying the coupling devices, for instance, through particular deflection devices.

REFERENCE CHARACTERS

01 Idler gear wheel on the first Countershaft
02 Idler gear wheel on the first Countershaft
03 Idler gear wheel on the first Countershaft
04 Idler gear wheel on the first Countershaft
05 Idler gear wheel on the second Countershaft
06 Idler gear wheel on the second Countershaft
07 Idler gear wheel on the second Countershaft
08 Idler gear wheel on the second Countershaft
09 Fixed gear wheel on the first Countershaft as Output Stage 10 Fixed gear wheel on the second Countershaft as Output Stage
11 Fixed gear wheel on the Output Shaft
12 Fixed gear wheel on the second Transmission Input Shaft
13 Fixed gear wheel on the second Transmission Input Shaft
14 Fixed gear wheel on the first Transmission Input Shaft
15 Fixed gear wheel on the first Transmission Input Shaft
16 Torsion Vibration Damper
K1 First Clutch
K2 Second Clutch
w_an Drive Shaft
w_ab Output Shaft
w_vorgelege1 first Countershaft
w_vorgelege 2 second Countershaft
A-B dual action Coupling Device
C-D dual action Coupling Device
E single action Coupling Device
E-F dual action Coupling Device
F-G dual action Coupling Device
G single action Coupling Device
H additional Shifting Device
i Gear Transmission Ratio
phi Transmission Ratio Spread
1 First Forward Gear
2 Second Forward Gear
3 Third Forward Gear
4 Fourth Forward Gear
5 Fifth Forward gear
6 Sixth Forward Gear
7 Seventh Forward Gear
RA1 First Reverse Gear
RA2 Second Reverse Gear
RB1 alternative first Reverse Gear
R1 first Reverse Gear
R2 second Reverse Gear
w_zw Intermediate Shaft
17 Idler gear wheel on the Intermediate Shaft

The invention claimed is:

1. A double clutch transmission comprising
first and second clutches (K1, K2) each comprising an input side connected to an input shaft (w_an) and an output side respectively connected to one of first and second transmission input shafts (w_K1, w_K2) that are arranged coaxially with one another;
at least first and second countershafts (w_vorgelege1, w_vorgelege2) rotatably supporting idler gear wheels (01, 02, 03, 04, 05, 06, 07, 08);
fixed gear wheels (12, 13, 14, 15) being supported, on each of the first and second transmission input shafts (w_K1, w_K2), in a rotationally fixed manner and each of the fixed gear wheels (12, 13, 14, 15) engaging at least one of the idler gear wheels (01, 02, 03, 04, 05, 06, 07);
a plurality of coupling devices (A-B, C-D, E, E-F, F-G, G) being supported on the first and the second countershafts (w_vorgelege1, vorgelege2), each of the plurality of coupling devices (A-B, C-D, E, E-F, F-G, G) connecting an idler gear wheel (01, 02, 03, 04, 05, 06) with one of the first and the second countershafts (w_vorgelege1, w_vorgelege2) in a rotationally fixed manner;
first and second output gearwheels (09, 10) each engaging gearing of an output shaft (w_ab);
at least one shifting device (H) for coupling the first and the second transmission input shafts (w_K1, w_K2); and
four gear wheel planes (01-05; 02-13, 02-06; 03-07; 04-15, 04-08) being arranged such that at least seven power shiftable forward gears (1, 2, 3, 4, 5, 6, 7) and at least one reverse gear (RA1, R1) are engagable and at least one power shiftable winding-path gear is engaged via the at least one shifting device (H).

2. The double clutch transmission according to claim 1, wherein at least one of the at least one power shiftable winding-path gear and non-power shiftable winding-path gears is one of an overdrive gear, an off-road gear, an intermediate gear, and an additional reverse gear.

3. The double clutch transmission according to claim 1, wherein at least a first forward gear (1) and a reverse gear (RA2, RB1, R2) are shifted as the at least one power shiftable winding-path gear.

4. The double clutch transmission according to claim 1, wherein the four gear wheel planes (01-05, 02-13, 03-06, 04-07) comprise first and second fixed gear wheels (12, 13, 14, 15) on the first and the second transmission input shafts (w_K1, w_K2) and idler gear wheels (01, 02, 03, 04) on the first second countershafts (w_vorgelege1, w_vorgelege2).

5. The double clutch transmission according to claim 1, wherein a first fixed gear wheel (12) on the second transmission input shaft (w_K2) engages with an idler gear wheel (01) on the first countershaft (w_vorgelege1) and an idler gear wheel (05) on the second countershaft (w_vorgelege2) to form a first gear plane (01-05).

6. The double clutch transmission according to claim 1, wherein a fixed gear wheel (13) on the second transmission input shaft (w_K2) engages with an idler gear wheel (02) on the first countershaft (w_vorgelege1) to form a second gear plane (02-13).

7. The double clutch transmission according to claim 1, wherein a fixed gear wheel (14) on the first transmission input shaft (w_K1) engages with an idler gear wheel (03) on the first countershaft (w_vorgelege1) and an idler gear wheel (06) on the second countershaft (w_vorgelege2) to form a third gear plane (03-06).

8. The double clutch transmission according to claim 1, wherein a fixed gear wheel (15) on the first transmission input shaft (w_K1) engages with an idler gear wheel (07) on the second countershaft (w_vorgelege2), and an idler gear wheel (17) engages with the fixed gear wheel (15) on the first transmission input shaft (w_K1) and an idler gear wheel (04) on the first countershaft (w_vorgelege1) to form a fourth gear plane (04-07).

9. The double clutch transmission according to claim 1, wherein an idler gear wheel (17) engages with an idler gear wheel (04) on the first countershaft (w_vorgelege1) and is supported on an intermediate shaft (w_zw).

10. The double clutch transmission according to claim 1, wherein an idler gear wheel (04) on the first countershaft (w_vorgelege1) engages with an idler gear wheel (07) on the second countershaft (w_vorgelege2).

11. The double clutch transmission according to claim 8, wherein the idler gear wheel (07, 17), which engages with the idler gear wheel (04) on the first countershaft (w_vorgelege1), is a step gear.

12. The double clutch transmission according to claim 8, wherein a dual action coupling device (A-B) is located on each countershaft (w_vorgelege1, w_vorgelege2) between the first gear plane (01-05) and the second gear plane (02-13).

13. The double clutch transmission according to claim 8, wherein a dual action coupling device (C-D, F-G) is located on each countershaft (w_vorgelege1, w_vorgelege2), between the third gear plane (03-06) and the fourth gear plane (04-07).

14. The double clutch transmission according to claim 8, wherein a single action coupling device (E) is located on the second countershaft (w_vorgelege2), adjacent the first gear plane (01-05).

15. The double clutch transmission according to claim 1, wherein the at least one shifting device (H), on the first countershaft (w_vorgelege1), is located between the second gear plane (02-13) and the third gear plane (03-06).

16. The double clutch transmission according to claim 1, wherein the dual clutch transmission comprises first and second power shiftable winding-path gears,
   a first forward gear (1) is engaged as the first power shiftable winding path gear by engagement of the second clutch (K2) and shifting of a fifth coupling device (F-G) in a second direction (G);
   a second forward gear (2) is engaged by engagement of the first clutch (K1) and shifting of the fifth coupling device (F-G) in the second direction (G);
   a third forward gear (3) is engaged by engagement of the second clutch (K2) and shifting of a first coupling device (A-B) in a second direction (B);
   a fourth forward gear (4) is engaged by engagement of the first clutch (K1) and shifting of a third coupling device (C-D) in a first direction (C);
   a fifth forward gear (5) is engaged by engagement of the second clutch (K2) and shifting of the first coupling device (A-B) in a first direction (A);
   a sixth forward gear (6) is engaged by engagement of the first clutch (K1) and shifting of the fifth coupling device (F-G) in a first direction (F);
   a seventh forward gear (7) is engaged by engagement of the second clutch (K2) and a fourth coupling device (E) on the second countershaft (w_vorgelege2);
   a first reverse gear (RA1) is engaged as the second power shiftable winding-path gear by engagement of the second clutch (K2) and the at least one shifting device (H) and shifting of the third coupling device (C-D) in a'second direction (D); and
   a second reverse gear (RA2) and an alternative first reverse gear (RB1) are engaged by engagement of the first clutch (K1) and shifting of the third coupling device (C-D) in the second direction (D).

17. The double clutch transmission according to claim 2, wherein the four gear wheel planes (01-05, 02-06, 03-07, 04-15) are achieved via two fixed gear wheels (12, 13, 14, 15) on each of the first and the second input shafts (w_K1, w_K2), four idler gear wheels (01, 02, 03, 04) on the first countershaft (w_vorgelege1) and three idler gear wheels (05, 06, 07) on the second countershaft (w_vorgelege2).

18. The double clutch transmission according to claim 17, wherein a fixed gear wheel (12) on the second transmission input shaft (w_K2) engages with an idler gear wheel (01) on the first countershaft (w_vorgelege1) and an idler gear wheel (05) on the second countershaft (w_vorgelege2) to form a first gear plane (01-05).

19. The double clutch transmission according to claim 17, wherein a fixed gear wheel (13) on the second transmission input shaft (w_K2) engages with an idler gear wheel (02) on the first countershaft (w_vorgelege1) and an idler gear wheel (17) engages with the fixed gear wheel (13) on the second transmission input shaft (w_K2) and an idler gear wheel (06) on the second countershaft (w_vorgelege2) to form a second gear plane (02-06).

20. The double clutch transmission according to claim 19, wherein the idler gear wheel (17), which meshes with the idler gear wheel (06) on the second countershaft (w_vorgelege2), is supported on an intermediate shaft (w_zw).

21. The double clutch transmission according to claim 17, wherein an idler gear wheel (02) on the first countershaft (w_vorgelege1) engages with an idler gear wheel (06) on the second countershaft (w_vorgelege2).

22. The double clutch transmission according to claim 19, wherein the idler gear wheel (02, 17), which meshes with the idler gear wheel (06) on the second countershaft (w_vorgelege2), is a step gear.

23. The double clutch transmission according to claim 17, wherein a fixed gear wheel (14) on the first transmission input shaft (w_K1) engages with a idler gear wheel (03) on the first countershaft (w_vorgelege1) and an idler gear wheel (07) on the second countershaft (w_vorgelege2) to form a third gear plane (03-07).

24. The double clutch transmission according to claim 17, wherein a fixed gear wheel (15) on the first transmission input shaft (w_K1) engages with an idler gear wheel (04) on the first countershaft (w_vorgelege1) to form a fourth gear plane (04-15).

25. The double clutch transmission according to claim 17, wherein a dual action coupling device (A-B, E-F) is located on each of the first and the second countershafts (w_vorgelege1, w_vorgelege2) between a first gear plane (01-05) and a second gear plane (02-06).

26. The double clutch transmission according to claim 17, wherein a dual action coupling device (C-D) is located on the first countershaft (w_vorgelege1), between a third gear plane (03-07) and a fourth gear plane (04-15).

27. The double clutch transmission according to claim 17, wherein a single action coupling device (G) is located on the second countershaft (w_vorgelege2) adjacent a third gear plane (03-07) on a side thereof away from the first and the second clutches (K1, K2).

28. The double clutch transmission according to claim 17, wherein the at least one shifting device (H) on the first countershaft (w_vorgelege1) is located between a second gear plane (02-06) and a third gear plane (03-07).

29. The double clutch transmission according to claim 17, wherein the dual clutch transmission comprises first and second power shiftable winding-path gears,
   a first forward gear (1) is engaged as the first power shiftable winding-path gear by engagement of the second clutch (K2), a fourth coupling device (G) on the first countershaft (w_vorgelege1), and the at least one shifting device (H);
   a second forward gear (2) is engaged by engagement of the first clutch (K1) and shifting of the fourth coupling device (G) on the first countershaft (w_vorgelege1);
   a third forward gear (3) is engaged by engagement of the second clutch (K2) and shifting of a first coupling device (A-B) in a second direction (B);
   a fourth forward gear (4) is engaged by engagement of the first clutch (K1) and shifting of a second coupling device (C-D) in a first direction (C);
   a fifth forward gear (5) is engaged by engagement of the second clutch (K2) and shifting of a third coupling device (E-F) in a first direction (E);
   a sixth forward gear (6) is engaged by engagement of the first clutch (K1) and shifting of a second coupling device (C-D) in a second direction (D);
   a seventh forward gear (7) is engaged by engagement of the second clutch (K2) and shifting of the first coupling device (A-B) in a first direction (A);

a first reverse gear (R1) is engaged by engagement of the second clutch (K2) and shifting of the third coupling device (E-F) in a second direction (F);

a second reverse gear (R2) is engaged as the second power shiftable winding-path gear by engagement of the first clutch (K1) and the at least one shifting device (H) and shifting of the third coupling device (E-F) in a second direction (F).

30. The double clutch transmission according to claim 1, wherein the four gear wheel planes (01-05, 02-06, 03-07, 04-08) comprise two fixed gear wheels (12, 13, 14, 15) on each of the first and the second input shafts (w_K1, w_K2), four idler gear wheels (01, 02, 03, 04) on the first countershaft (w_vorgelege1), and four idler gear wheels (05, 06, 07, 08) on the second countershaft (w_vorgelege2).

31. The double clutch transmission according to claim 30, wherein a fixed gear wheel (12) on the second transmission input shaft (w_K2) engages with an idler gear wheel (01) on the first countershaft (w_vorgelege1) and an idler gear wheel (05) on the second countershaft (w_vorgelege2) to form a first gear plane (01-05).

32. The double clutch transmission according to claim 30, wherein a fixed gear wheel (13) on the second transmission input shaft (w_K2) engages with the idler gear wheel (02) on the first countershaft (w_vorgelege1) and an idler gear wheel (06) on the second countershaft (w_vorgelege2) to form a second gear plane (02-06).

33. The double clutch transmission according to claim 30, wherein a fixed gear wheel (14) on the first transmission input shaft (w_K1) engages with an idler gear wheel (07) on the second countershaft (w_vorgelege2) and an idler gear wheel (17) engages with a fixed gear wheel (14) on the first transmission input shaft (w_K1) and an idler gear wheel (03) on the first countershaft (w_vorgelege1) to form a third gear plane (03-07).

34. The double clutch transmission according to claim 33, wherein the idler gear wheel (17), which engages with the idler gear wheel (03) on the first countershaft (w_vorgelege1), is located on an intermediate shaft (w_zw).

35. The double clutch transmission according to claim 30, wherein the idler gear wheel (03) on the first countershaft (w_vorgelege1) engages with the idler gear wheel (07) on the second countershaft (w_vorgelege2).

36. The double clutch transmission according to claim 33, wherein the idler gear wheel (07, 17), which engages with the idler gear wheel (03) on the first countershaft (w_vorgelege1), is a step gear.

37. The double clutch transmission according to claim 32, wherein a fixed gear wheel (15) on the first transmission input shaft (w_K1) engages with an idler gear wheel (04) on the first countershaft (w_vorgelege1) and an idler gear wheel (08) on the second countershaft (w_vorgelege2) to form a fourth gear plane (04-08).

38. The double clutch transmission according to claim 30, wherein a dual action coupling device (A-B, E-F) is located on each of the first and the second countershafts (w_vorgelege1, w_vorgelege2) between the first gear plane (01-05) and the second gear plane (02-06).

39. The double clutch transmission according to claim 32, wherein a dual action coupling device (C-D) is located on the first countershaft (w_vorgelege1), between a third gear plane (03-07) and a fourth gear plane (04-08).

40. The double clutch transmission according to claim 32, wherein a single action coupling device (G) is located on the second countershaft (w_vorgelege2) adjacent a fourth gear plane (04-08).

41. The double clutch transmission according to claim 30, wherein the at least one shifting device (H) on the a second countershaft (w_vorgelege2) is positioned between a second gear plane (02-06) and a third gear plane (03-07).

42. The double clutch transmission according to claim 40, wherein the single action coupling device (G) and the at least one shifting device (H) are each single action coupling devices.

43. The double clutch transmission according to claim 30, wherein a first forward gear (1) is engaged by engagement of the second clutch (K2) and shifting of a first coupling device (A-B) in a second direction (B);

a second forward gear (2) is engaged by engagement of the first clutch (K1) and shifting of a second coupling device (C-D) in a first direction (C);

a third forward gear (3) is engaged by engagement of the second clutch (K2) and shifting of a third coupling device (E-F) in a second direction (F);

a fourth forward gear (4) is engaged by engagement of the first clutch (K1) and shifting of the second coupling device (C-D) in a second direction (D);

a fifth forward gear (5) is engaged by engagement of the second clutch (K2) and shifting of the first coupling device (A-B) the first direction (A);

a sixth forward gear (6) is engaged by engagement of the first clutch (K1) and a fifth coupling device (G) on the second countershaft (w_vorgelege2);

a seventh forward gear (7) is engaged by engagement of the second clutch (K2) and shifting of the third coupling device (E-F) in a fourth direction (E); and a reverse gear (R1) is engaged as the at least one power shiftable winding-path gear by engagement of the second clutch (K2) and the at least one shifting device (H) and shifting of the second coupling device (C-D) in a first direction (C).

44. The double clutch transmission according to claim 1, wherein the drive shaft (w_an) and the output shaft (w_ab) are not coaxially positioned with respect to each other.

45. The double clutch transmission according to claim 1, wherein an integrated output stage comprises a fixed gear wheel (11) on the output shaft (w_ab), which engages with the first output gear wheel (09) on the first countershaft (w_vorgelege1) and with the second output gear wheel (10) on the second countershaft (w_vorgelege2).

46. The double clutch transmission according to claim 1, wherein lower forward gears and reverse gears are engaged by engagement of one of the first and the second clutches (K1, K2) which operates as one of a starting clutch and a gear shifting clutch.

\* \* \* \* \*